(12) United States Patent
Xu

(10) Patent No.: US 9,151,820 B2
(45) Date of Patent: Oct. 6, 2015

(54) LATERALLY-ADJUSTED AUTOMATIC SOLAR TRACKING DEVICE

(76) Inventor: Qiming Xu, Shaanxi (CN)

( * ) Notice: Subject to any disclaimer, the term of this patent is extended or adjusted under 35 U.S.C. 154(b) by 362 days.

(21) Appl. No.: 13/878,895

(22) PCT Filed: Oct. 12, 2011

(86) PCT No.: PCT/CN2011/080686
§ 371 (c)(1),
(2), (4) Date: Jun. 11, 2013

(87) PCT Pub. No.: WO2012/048640
PCT Pub. Date: Apr. 19, 2012

(65) Prior Publication Data
US 2013/0256506 A1 Oct. 3, 2013

(30) Foreign Application Priority Data
Oct. 12, 2010 (CN) .......................... 2010 1 0503502

(51) Int. Cl.
*G01S 3/786* (2006.01)
*F24J 2/54* (2006.01)

(52) U.S. Cl.
CPC ............. *G01S 3/7861* (2013.01); *F24J 2/5413* (2013.01); *F24J 2002/5465* (2013.01); *F24J 2002/5486* (2013.01); *Y02E 10/47* (2013.01)

(58) Field of Classification Search
CPC G01S 3/7861; G01S 3/786; F24J 2002/5486; F24J 2/5413
See application file for complete search history.

(56) References Cited

U.S. PATENT DOCUMENTS 4,585,318 A 4/1986 Seifert
6,465,766 B1 * 10/2002 Zhang ........................ 250/203.4

FOREIGN PATENT DOCUMENTS

| CN | 101004609 A | 7/2007 |
| CN | 201515331 U | 6/2010 |
| CN | 101943914 A | 1/2011 |
| CN | 102129252 A | 7/2011 |
| DE | 3316731 A1 | 11/1984 |

* cited by examiner

*Primary Examiner* — Francis M Legasse, Jr.
*Assistant Examiner* — Don Williams
(74) *Attorney, Agent, or Firm* — The Webb Law Firm

(57) ABSTRACT

Disclosed is a laterally-adjusted automatic solar tracking device. The upper ends of two support posts are fastened to a north-south rotary shaft via which a sunlight collector rack is connected to the support posts. A light intensity signal collector is mounted on the top surface of the sunlight collector rack. A worm gear transmission mechanism and a controller are disposed at the lower portions of the two support posts, wherein output torque from the worm gear transmission mechanism is borne by a lift rod. A telescopic sleeve is disposed outside the lift rod and a hinge ring is provided on the outer upper end of the lift rod. The lift rod is fastened to an edge of the sunlight collector rack via a thrust bearing and a joint bearing. The lower end of the lift rod is arranged in an oil sump.

8 Claims, 4 Drawing Sheets

LATERALLY-ADJUSTED AUTOMATIC SOLAR TRACKING DEVICE

TECHNICAL FIELD

The present invention belongs to the technical field of solar photovoltaic power generation and solar photo-thermal utilization, and in particular relates to a hybrid solar tracking device.

BACKGROUND ART

As a sustainable clean energy, solar energy is an ideal renewable energy. Due to low energy density, poor continuity in energy reception, variability with seasons, day and night and climate, solar energy is mainly applied in fields that have low requirements in energy density, allow discontinuity of light collecting and have scattered customers, such as solar water heaters and solar greenhouses. It is an effective way to save mineral resources, reduce $CO_2$ emission, ensure energy safety and realize sustainable development by putting great efforts in developing solar photovoltaic power generation and solar photo-thermal power generation.

The chief factors inhibiting solar photovoltaic power generation are high costs in photovoltaic conversion, great fluctuation in power generation capacity and inconvenience in long distance transmission. If the weather conditions are the same, solar tracking techniques would enable solar cells constantly perpendicular to sunlight, which is beneficial in enhancing utilization of solar energy and can increase power generation capacity while prolonging power generation period, and which is also effective in mitigating effects on grid fluctuation to some extent while reducing costs of solar photovoltaic power generation. In light of the above reasons, solar tracking techniques arrest high attention.

Tracking techniques can be generally categorized into three types on the basis of the means of generating control signals by a control unit, i.e. active tracking, passive tracking and hybrid tracking. Tracking techniques can also be categorized into uni-axial tracking and bi-axial tracking according to the number of rotary shafts in a rotary stage-adjusting member. Tracking techniques, by combining the above two categorizations, may be categorized into active uni-axial tracking, active bi-axial tracking, passive uni-axial tracking, passive bi-axial tracking, hybrid uni-axial tracking and hybrid bi-axial tracking.

Universal problems in current tracking techniques are: high energy consumption in driving and operation, and poor stability and high manufacturing costs of tracking devices. The main reasons are that the central support post of the tracking devices serves the following three functions simultaneously: a support for total gravities, a rotary center, an acting point of the reacting force of the tracking driving force, and even an acting point of the tracking driving force itself. Therefore, current solar tracking techniques are limited in utilization of solar energy.

SUMMARY OF THE INVENTION

With respect to the above drawbacks and shortcomings stated in the background art, the object of the present invention is to provide a laterally-adjusted automatic solar tracking device with low energy consumption that has a simple structure and excellent stability and can be precisely and conveniently controlled by using lever principle, three-point location or point-line location, noon-time coordinate origin positioning and timing and one-dimensional driving.

In order to achieve the above object, the present invention employs the following technical solutions:

A laterally-adjusted automatic solar tracking device comprises a light intensity signal collector, a sunlight collector rack, a main support post, an auxiliary support post, a lift rod, a sleeve, a worm gear transmission mechanism, a step motor, a controller, a base and an oil sump, wherein the upper ends of the main support post and the auxiliary support post are respectively fastened to a north-south rotary shaft of the sunlight collector rack, the lower ends of the main support post and the auxiliary support post are fixed to the ground via the base, the light intensity signal collector is mounted on the top surface of the sunlight collector rack, the lift rod is disposed between one side of the north-south rotary shaft of the sunlight collector rack and an edge of the sunlight collector rack in a north-south axial direction, the lift rod is fastened to the bottom surface of the sunlight collector rack and is concentrically arranged with a worm gear of the worm gear transmission mechanism and passes through the center of the wonn gear, wherein a telescopic sleeve is disposed outside the lift rod above the worm gear transmission mechanism to enclose the lift rod within the sleeve, the lift rod below the worm gear transmission mechanism is arranged in the oil sump, the bottom surface of the worm gear transmission mechanism is fixed to the ground via the base, and the step motor is mounted outside the wonn gear transmission mechanism and is connected to the controller via a power source and control signal cable.

The present invention further includes the following technical features:

The upper ends of the main support post and the auxiliary support post are fastened to the north-south rotary shaft of the sunlight collector rack respectively via a joint bearing and a pressure bearing and the lift rod is fastened to the bottom surface of the sunlight collector rack via a thrust bearing and a joint bearing so that the sunlight collector rack forms a three-point fastening structure or a point-line fastening structure with the main support post, the auxiliary support post and the lift rod.

The upper end of the lift rod is fastened to the bottom surface of the sunlight collector rack, and the sole immobile point during swing of the lift rod is an intersection between the lift rod and the bottom surface of the worm gear transmission mechanism and the base when the lift rod passes through the worm gear transmission mechanism, the intersection being directly fixed to the ground.

An external thread mating with an internal thread in the center of the worm gear of the worm gear transmission mechanism is provided on the outer surface of the lift rod for bearing output torque from the worm gear transmission mechanism, the telescopic sleeve disposed outside the lift rod above the worm gear transmission mechanism is formed by an upper sleeve, an intermediate sleeve and a lower sleeve having sequentially decreased radii from the top to the bottom of the sleeve, wherein the intermediate sleeve is designed as one or more segments according to a user's requirements, and the sleeve is provided with a fastening flange at the upper end thereof and a fastening flange at the lower end thereof.

The bottom surface of the worm gear transmission mechanism is fastened to the base via a double spherical bearing, and the lift rod passes through the center of the double spherical bearing so that the double spherical bearing can freely swing in a horizontal plane with the lift rod.

The worm gear transmission mechanism comprises a gear set and a worm gearing system, the controller comprises a microprocessor, driving torque and rotational speed of the step motor is controlled by a program stored in the microprocessor which also stores information of sun travelling position and local standard time corresponding to meridian passage at the device installation site, and the controller is provided with an on/off button, an anti-windstorm button and an anti-hail button on a panel thereof.

The light intensity signal collector converts light intensity signals of the sun into electrical signals and outputs horizon signals of the sunlight collector rack in a west-east direction so as to control on/off of the device and correct solar tracking errors via the controller.

Compared with the prior art, the laterally-adjusted automatic solar tracking device of the present invention has the following advantages:

1. On the basis of level principle, the length of the driving force arm is increased by using the natural length of the sunlight collector (photovoltaic assembly or photo-thermal collector) rack as the force arm, and the driving force and thereby the energy consumption for tracking the sun is effectively decreased by changing the entire mechanical structure of the tracking device.

2. Stability and anti-windstorm capability of the tracking device is improved by using a rigid three-point fastening or point-line fastening structure of the sunlight collector rack according to geometrical principle.

3. Symmetry of time sequence is enhanced by using meridian passage coordinate origin positioning to avoid drift of the coordinate origin due to changes in sunrise positions, thereby improving solar tracking stability and precision.

4. Revolution of the step motor is used to depict the real-time position of the sun for precise positioning.

5. Solar tracking is stopped automatically on cloudy and rainy days to save energy.

6. Hybrid control with combination of active and passive control is used to enhance solar tracking precision.

7. A ventilation duct is provided between every two assemblies.

8. The sunlight collector rack is at the noon-time position when it is stormy so as to reduce resistance to windstorm and thereby enhance anti-windstorm capability.

9. Manual control and central control cabinet are provided to enable a minimum angle between the sunlight collector rack and the vertical direction when there is hail so as to improve anti-hail capability.

10. All the parameters controlled by the program are adjustable to meet the geographical coordinate and weather condition at the device installation site.

11. In accordance with hydromechanics principle, when the sunlight collector rack of the solar tracking device of the present invention has a west-east width of about 2 m, the photovoltaic assemblies which can be carried have a suitable size so that strong windstorm in the high sky can be dodged while costs can be effectively reduced.

LIST OF REFERENCE NUMERALS

1: light intensity signal collector; 2: sunlight collector rack; 3: north-south rotary shaft; 4: main support post; 5: sleeve; 6: lift rod; 7: worm gear transmission mechanism; 8: controller; 9: power source and control signal cable; 10: oil sump; 11: base; 12: step motor; 13: auxiliary support post, 14: external thread connecting the upper end of the lift rod and the joint bearing; 15: fastening flange at the upper end of the sleeve; 16: upper sleeve; 17: intermediate sleeve; 18: lower sleeve; 19: fastening flange at the lower end of the sleeve; 20: north-south rotary shaft of the sunlight collector rack, wherein the arrow represents the direction of the polar axis; 21: thrust bearing; 22: joint bearing; 23: through hole for the lift rod; 24: double spherical bearing; 25: connecting flange.

DETAILED DESCRIPTION OF THE INVENTION

The present invention is described in detail with reference to the drawings. It should be understood that the embodiments herein is only used to introduce and explain the present invention, but should not be regarded as limitations to the present invention.

Figure 1:
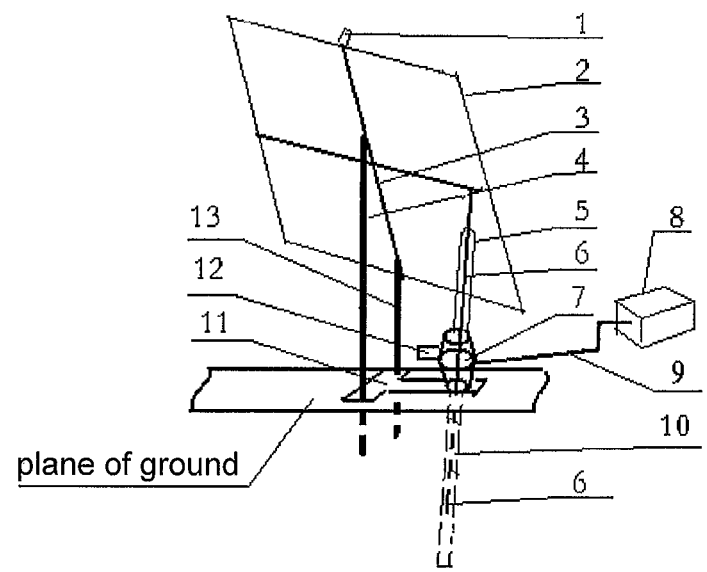
FIG. 1 is a schematic view of the tracking device of the present invention in a noon-time and halt state.
Figure 2:
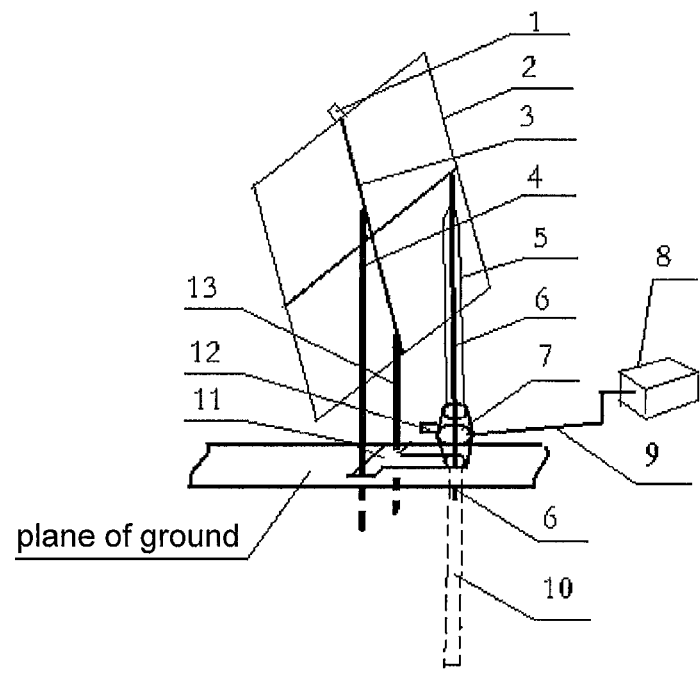
FIG. 2 is a schematic view of the tracking device of the present invention in an operating state at a time before meridian passage.
Figure 3:
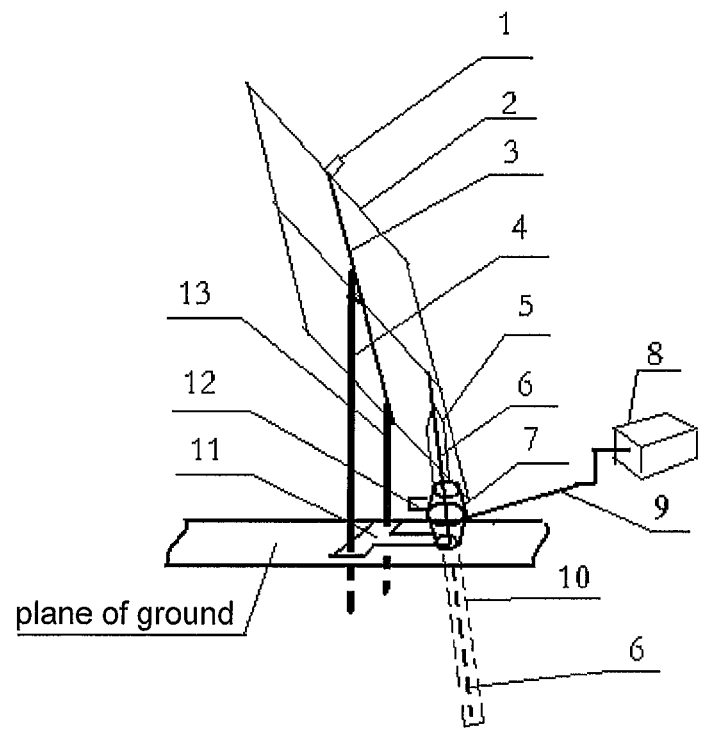
FIG. 3 is a schematic view of the tracking device of the present invention in an operating state at a time after meridian passage.
Figure 4:
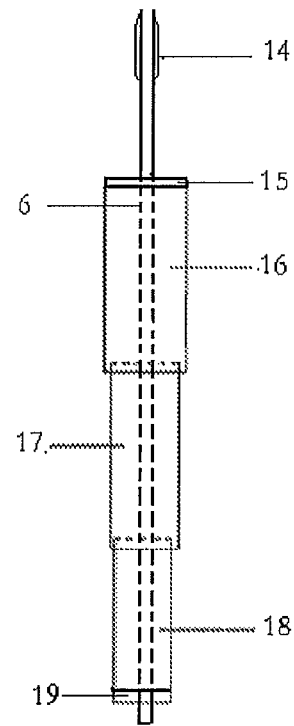
FIG. 4 is a schematic view of the sealing sleeve outside the lift rod of the tracking device of the present invention.
Figure 5:
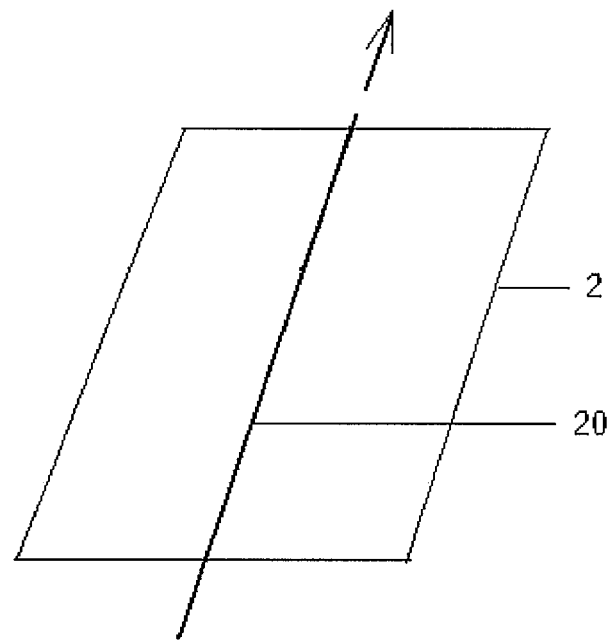
FIG. 5 is a schematic view showing the orientation of the north-south rotary shaft of the sunlight collector of the present invention.
Figure 6:
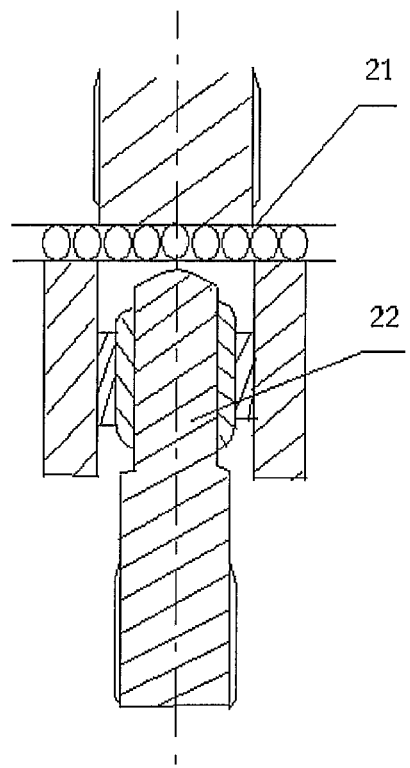
FIG. 6 is a schematic view showing the combination of a thrust bearing and a joint bearing of the tracking device of the present invention.
Figure 7:
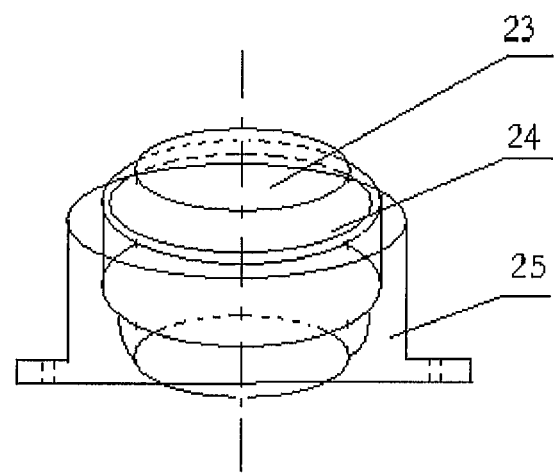
FIG. 7 is a schematic view showing a double spherical joint bearing of the tracking device of the present invention.

Referring to FIGS. 1-5, the laterally-adjusted automatic solar tracking device of the present invention comprises a light intensity signal collector 1, a sunlight collector rack 2, a main support post 4, an auxiliary support post 13, a lift rod 6, a sleeve 5, a worm gear transmission mechanism 7, a step motor 12, a controller 8, a base 11 and an oil sump 10, wherein the upper ends of the main support post 4 and the auxiliary support post 13 fixed to the ground are both fastened to a north-south rotary shaft 3 of the sunlight collector rack 2 respectively by means of a joint bearing and a pressure bearing to ensure that the north-south rotary shaft is immobile during the tracking process. The auxiliary support post 13 of the present invention may be omitted; in this case, the upper end of the main support post 4 is fastened to the central point of the sunlight collector rack 2 by means of a joint bearing and a thrust bearing. The light intensity signal collector 1 is mounted on the top surface of the sunlight collector rack 2. The lift rod 6 is disposed between one side of the north-south rotary shaft 3 of the sunlight collector rack 2 and an edge of the sunlight collector rack 2 in a north-south axial direction. The sunlight collector rack 2 is merely capable of rotating about the north-south rotary shaft with pull-and-push of the lift rod 6 so as to enable the sunlight collector rack 2 and other photovoltaic assemblies or heat collectors fixed thereto to track the sun. The thrust bearings connected at the upper ends of the main support post 4, the auxiliary support post 13 and the lift rod 6 may be omitted if the tracking device is used in low latitude areas. The light intensity collector 1 further has a function of collecting horizon signals of the sunlight collector rack 2 in a west-east direction during the tracking process, which function can be independently realized by a horizon signal sensor. The light intensity signal collector 1 transmits relevant collected signals to the controller 8 via a cable for processing and outputting. The material, shape and dimension of the sunlight collector rack 2 may be designed according to a user's requirements.

The lift rod 6 is fastened to the bottom surface of the sunlight collector rack 2 by means of a thrust bearing 21 and a joint bearing 22. The intersection between the lift rod 6 and the bottom surface of the worm gear transmission mechanism 7 and the base 11 when the lift rod 6 passes through the worm gear transmission mechanism 7 is the sole junction during swinging of the lift rod 6, the junction being directly fixed to the ground via the base, thereby separating multiple functions of the central post or base of a traditional tracking device. In the present invention, the acting point of the tracking driving force is delicately removed from the central support post by the lift rod 6, thereby separating functions of a traditional central post or base, i.e. keeping the functions as a rotary center of the tracking device and a support for a portion of the gravities for the central post or base, but removing the functions as an acting point of the tracking driving force and a support for a portion of the gravities from the central post or base.

Meanwhile, with lever principle in physics, due to the geometry of the sunlight collector rack 2, the tracking driving force is migrated from the central rotary shaft to a suitable position between the central rotary shaft and the outer profile of the sunlight collector rack 2, e.g. is migrated to one side of the sunlight collector rack 2 away from the central main support post 4 and acts on the one side of the sunlight collector rack 2 due to the lift rod 6, which increases the force arm of the tracking driving force with respect to the north-south rotary shaft 3, thereby reducing the tracking driving force and driving energy consumption.

It is thus clear that in the present invention, the sunlight collector rack is completely determined at any tracking moment by using an immobile north-south rotary shaft (straight line) and a support point (i.e. the fastening point between the sunlight collector rack and the lift rod) or by using three support points (i.e. the fastening points between the sunlight collector rack and the main support post, the auxiliary support post and the lift rod respectively), with the geometrical principle that a plane is determined by a line and a point outside the line or by three non-collinear points. That is to say, the movement state of the immobile north-south rotary shaft 3 and the sunlight collector rack 2 at the top surface of the lift rod 6, i.e. the planar position of a photovoltaic assembly, is solely determined The three-point or point-line fastening structure effectively improves stability of the sunlight collector rack and enhances anti-windstorm capability.

The lift rod 6 is concentrically arranged with the worm gear of the worm gear transmission mechanism 7 and passes through the center of the worm gear; an external thread 14 mating with an internal thread in the center of the worm gear of the worm gear transmission mechanism 7 is provided on the outer surface of the lift rod 6 for bearing output torque from the worm gear transmission mechanism 7. The lift rod 6 passing through the center of the worm gear can swing about a chassis fixing center of the worm gear transmission mechanism 7 together with the worm gear transmission mechanism 7 so that the lift rod 6 deviates from the vertical line when the sunlight collector rack 2 rotates about the north-south rotary shaft 3 during the tracking period.

A telescopic sleeve 5 is disposed outside the lift rod 6 above the worm gear transmission mechanism 7 to enclose the lift rod 6 within the sleeve 5; the telescopic sleeve 5 is formed by an upper sleeve 16, an intermediate sleeve 17 and a lower sleeve 18 having sequentially decreased radii from the top to the bottom of the sleeve, wherein the intermediate sleeve 17 is designed as one or more segments according to a user's requirements; the sleeve 5 is provided with a fastening flange 15 at the upper end thereof and a fastening flange 19 at the lower end thereof. The telescopic sleeve 5 disposed outside the lift rod 6 is mainly for protecting the lift rod from wind, rain and dust; because the lift rod 6 simply bears the weight of the sleeve, there is no strict requirement for the material and strength thereof. The sequentially decreased radii from the top to the bottom of the telescopic sleeve are designed to prevent rain flowing into the sleeve.

The lift rod 6 below the worm gear transmission mechanism 7 is disposed in an oil sump 10; lubricant oil in the oil sump 10 lubricates the lift rod 6 with the aid of up and down movement of the lift rod and action between the threads of the worm gear. The bottom surface of the worm gear transmission mechanism 7 is fastened to the base 11 and the ground via a double spherical bearing 24 and the oil sump 10 is fastened to the double spherical bearing 24 below the worm gear transmission mechanism; the lift rod 6 passes through the center of the double spherical bearing 24 so that the double spherical bearing 24 can freely swing in a horizontal plane with the lift rod 6.

The worm gear transmission mechanism 7 comprises a gear set, a worm gearing system and a torque output gear fastened to the worm gear. A step motor 12 is mounted outside the worm gear transmission mechanism 7 to provide driving torque for the worm gear transmission mechanism 7. The position of the upper end of the lift rod 6 between one side of the north-south rotary shaft 3 of the sunlight collector rack 2 and the edge of the sunlight collector rack 2 in a north-south axial direction is determined based on factors such as driving force arm, optimum rotational speed of the step motor and corresponding output torque, driving energy consumption, length of the lift rod, height of the main support post and desired anti-windstorm capability. Generally, the main factors are optimum rotational speed of the motor and corresponding output torque, driving energy consumption and length of the lift rod.

The optimum elevation angle for tracking the sun at a place is 30°, the sunlight collector rack has a width of 2 m in east-west direction and a length of 3.6 m and carries a photovoltaic assembly of 940 Wp, the tracking time being ten hours every day (i.e. the meridian passage time sequence interval in the present invention is −5 o'clock to 5 o'clock, equivalent to Beijing time 7 o'clock to 15 o'clock in Beijing); the main support post is fastened in the middle of the sunlight collector rack and the maximum thrust required at the edge of the sunlight collector rack in a east-west direction is 6 kg. Because the mean traveling angle of the sun per hour is 15°, it is known from the tracking time that the rotation angle of the photovoltaic assembly within a day is 150°, and the ante meridiem and the post meridiem is 75° respectively because of symmetry of the tracking time relative to the meridian passage position. The maximum length of the lift rod is determined by the start position of tracking at the ante meridiem: length of a half of the photovoltaic assembly is 1 m, and the cosine of 75° is 0.259 m; because 1.8 sin 30°+1.0 cos 75°=1.159 m, the height of the main support post shall be greater than 1.159 m; if the height is selected as 1.30 m and the minimum height of the lift rod below the worm gear transmission mechanism is 0.15 m, considering that a sufficient allowance, e.g. 0.05 m, shall be left at the outer edge of the sunlight collector rack when the lift rod is fastened to the sunlight collector rack and thus 0.95 cos 75° is 0.246 m, the maximum length of the lift rod is 1.3+0.246+0.15=1.696 m, the actual maximum length of the lift rod being selected as 1.7 m. The maximum depth of the lift rod in the oil sump is (0.246×2)m+0.15 m=0.642 m. The lift rod employs T20×4 thread; the step motor of 42BYG250 type with rated current of 0.4 A and torque of 210 mn.m can meet the thrust requirement.

Orientation of the north-south rotary shaft of the sunlight collector rack varies with geographical latitude, i.e. the angle (i.e. elevation angle) between the photovoltaic assembly plane or the sunlight collector plane and the horizontal plane varies with geographical latitude; variation of the angle can be adjusted by the height difference of the main and auxiliary support posts. For uni-axial tracking devices, the angle is constant when the geographical position is given.

The step motor is connected to a controller 8 via a power source and a control signal cable 9. The controller 8 includes a microprocessor; the driving force and rotational speed of the step motor 12 are controlled by a program stored in the microprocessor; the microprocessor further stores sun traveling position information and meridian passage information at the device installation site; an on/off button, an anti-windstorm button and an anti-hail button are arranged on a panel of the controller.

It needs to be emphasized that the north-south rotary shaft 3 of the present invention must be within a vertical plane of the north-south polar axis of the earth.

In accordance with the characteristic that the meridian passage position always corresponds to a horizontal position, "meridian passage positioning" control is introduced to set coordinate origin at the meridian passage and to use local time as control time sequence. Thus, the photovoltaic assembly plane is entirely symmetrical during rotating toward two sides from the meridian passage position, which exhibits the following advantages compared with current control methods:

(1) symmetry of the photovoltaic assembly during operation is enhanced, and control variables can be decreased by 50% according to symmetry principle so that control process is simplified and control precision is improved;

(2) a constant reference is provided for device maintenance so that the problem of drifting of the coordinate origin each time when current tracking devices are maintained can be solved;

(3) when the coordinate origin is set at the meridian passage, the local time is symmetrical with respect to the meridian passage so that the control process is effectively simplified, thereby providing a basis for improving control precision.

The following is the main control principle of the "meridian passage positioning" of the present invention: the microprocessor sets the Beijing time corresponding to noon-time on the day when installing the device and defines the time as zero o'clock of the day, thereby the time used by the control program (hereinafter referred as "control time")=current local standard time (e.g. Beijing time) at the device installation site–local standard time corresponding to noon-time on the day when installing the device at the device installation site. The rotational angle set corresponding to the starting-up time of the device is converted into a pulse output for driving the step motor to rotate rapidly, so that the motor rapidly rotates the sunlight collector rack 2 to a position facing the sun at the starting-up time; then the microprocessor enables the motor to synchronize rotation of the sunlight collector rack 2 with the sun to track the sun based on the synchronizing rotation pulse output set corresponding to the rotational speed for synchronizing rotation of the sunlight collector rack 2 with the sun.

The principle of the correction step of the controller 8 is as follows: when detecting tracking delay of the sunlight collector rack 2, the light intensity signal collector 1 sends a delay signal to the microprocessor and the microprocessor then outputs a rapid rotation pulse to the step motor 12 so as to rapidly rotate the sunlight collector rack 2 to a position immediately facing the sun; when the sunlight collector rack 2 rapidly rotates to a position immediately facing the sun, the light intensity signal collector 1 informs the microprocessor of this and the microprocessor then outputs the step motor 12 a synchronizing rotation pulse output corresponding to the rotational speed for synchronizing rotation of the sunlight collector rack with the sun so that the step motor 12 rotates the sunlight collector rack 2 synchronously with the sun to track the sun. When detecting advance tracking of the sunlight collector rack 2, the light intensity signal collector 2 sends an advance signal to the microprocessor and the microprocessor then stops outputting any rotation pulse to the step motor so that the sunlight collector rack 2 stops rotating to wait until its position faces the sun; when the sunlight collector rack 2 faces the sun, the light intensity collector informs the microprocessor of this and the microprocessor then outputs the step motor 12 a synchronizing rotation pulse output corresponding to the rotational speed for synchronizing rotation of the sunlight collector rack with the sun so that the step motor 12 rotates the sunlight collector rack 2 synchronously with the sun to track the sun.

When the sunlight collector rack 2 is rotating about the north-south rotary shaft 3, the projection of a given point on one side of the sunlight collector rack 2 is moving in the horizontal plane. When the acting point of the tracking driving force, i.e. the central fixing position of the chassis of the worm gear transmission mechanism 7, is selected on a line between two projection points on the ground of the joint of the lift rod 6 and the sunlight collector rack 2 at the tracking start time in the morning and the tracking end time in the afternoon and the two angles between the lift rod at the tracking start time in the morning and at the tracking end time in the afternoon and the vertical line are the same, the position ensures a tracking period as long as possible.

The principle of the control step of determining cloudy and sunny days is as follows: when the light intensity signal collector 1 detects a sunny day, the main control and correction steps are carried out normally as stated hereinabove. When the light intensity signal collector 1 detects a cloudy day, the main control unit stops sending driving signals to the step motor and stops tracking; when the tracking stop time reaches a set time, the microprocessor drives the step motor to rotate rapidly so as to return the device to the noon-time position.

Here are several embodiments of the present invention:

Initial state: the normal line of the plane of the sunlight collector rack faces the noon-time position (see FIG. 1); parameters of the device: tracking time in summer: −4:00~5:00 (which corresponds to Beijing time 8:00~17:00 if the device is installed in Beijing), sunny to cloudy waiting period: 30 minutes; anti-wind capability: the device being capable of withstand 10-grade (28 m/s) wind at a device height of 1.5 m, which is equivalent to 12-grade typhoon at a device height of 10 m.

Embodiment 1: Sunny All Day and Normal Solar Tracking

−4:15: the device starts up automatically and the light intensity signal collector detects whether the light intensity of the sun reaches a set value. If not, the device is in a waiting state at the noon-time position; if yes, the device rapidly rotates from the noon-time position to a position corresponding to −4:00 of that day.

−4:00: the device automatically tracks the sun. During the tracking period, if the tracking delays due to some reason, when the light intensity signal collector detects that the tracking delay time reaches a set angle, the light intensity signal collector sends a correction signal to enable the device to rapidly rotate to the correct tracking position; if the device tracks the sun in advance due to some reason, when the light intensity signal collector detects that the device is so advanced to reach a certain angle, the light intensity signal collector sends a correction signal to stop rotation of the device; automatic solar tracking recovers when the device reaches the correct tracking position.

5:00: Automatic solar tracking of the device finishes and the device automatically returns to the noon-time position.

Embodiment 2: From Sunny to Cloudy and Rainy During the Solar Tracking Period

Weather condition: the weather turns from sunny to rainy at −3:00.

−4:00~−3:00: normal solar tracking is undergoing; −3:00: the light intensity signal collector detects that the weather turns to cloudy and rainy and then sends a signal to stop solar tracking so that the device enters a standby state; if the light intensity signal collector still does not detect that the weather turns from cloudy to sunny within 30 minutes after the device enters the standby state, the device automatically returns to the noon-time position and enters a standby state; the standby state ends at 5:00.

Embodiment 3: From Sunny to Cloudy and Rainy and Then to Sunny During the Solar Tracking Period Weather condition: the weather turns from sunny to cloudy at −3:00 and then turns to sunny after twenty-five or forty minutes.

−2:35: when the light intensity signal collector detects that the weather turns from cloudy to sunny, the device remains at the position of −3:00 because the period after the weather turns from cloudy to sunny does not reach 30 minutes. Or:

−2:20: when the light intensity signal detects that the weather turns from cloudy to sunny, the device is rapidly rotated and corrected from the noon-time standby state to the solar position of −2:20 and then starts to track the sun.

Embodiment 4: Sudden Windstorm During the Solar Tracking Period

Weather condition: sudden windstorm at 3:00.

This is treated differently in two circumstances, i.e. a single household device and multiple devices at a photovoltaic plant.

For a single or several household devices, because of yard and village environment, generally the wind at the device installation site is gentler than that in the field, it now may not be taken into consideration; if the wind in the yard and village is as great as 10 grade (28 m/s), a manual button may be activated to return the device to the noon-time position and then stop the devices.

For multiple devices at a photovoltaic plant, when the wind is as great as 10 grade (28 m/s), an operator on watch in a central control cabinet sends a signal by activating an anti-windstorm button to return all the solar tracking devices rapidly back to the noon-time position and then stop the devices.

Embodiment 5: Sunny After Sudden Windstorm During the Solar Tracking Period

After the windstorm, the device is in the noon-time position; when the light intensity collector detects that the weather turns from cloudy to sunny, the device is rapidly rotated and corrected from the noon-time standby state to the correct tracking position and starts to track the sun.

Embodiment 6: Sudden Hail During the Solar Tracking Period

For a single or several household devices, when there is hail, a manual button may be activated to rapidly return the device to the position at −4:00 or 5:00 and then stop the devices.

For multiple devices at a photovoltaic plant, when there is hail, an operator on watch in a central control cabinet sends a signal by activating an anti-hail button to return all the solar tracking devices to the position at −4:00 or 5:00 and then stop the devices.

Although preferred embodiments of the present invention have been described in detail with reference to the drawings hereinabove, the present invention is not limited to the specific forms as described in the above embodiments. Various simple variants to the technical solutions of the present invention may be made within the conception of the present invention and such variants fall in the protection scope of the present invention. In addition, it should be noted that the specific technical features described in the above embodiments may be combined in any suitable manner unless contradictory to each other. To avoid unnecessary repeated description, various possible combinations will not be described here. Besides, any combination of different embodiments of the present invention may be made without departing from the spirit of the present invention and should be regarded as disclosure of the present invention as well.

The invention claimed is:

1. A laterally-adjusted automatic solar tracking device, comprising a light intensity signal collector (1), a sunlight collector rack (2), a main support post (4), an auxiliary support post (13), a lift rod (6), a sleeve (5), a worm gear transmission mechanism (7), a step motor (12), a controller (8), a T-shaped base (11) and an oil sump (10), characterized in that the upper ends of the main support post (4) and the auxiliary support post (13) are respectively fastened to a north-south rotary shaft (3) of the sunlight collector rack (2), the lower ends of the main support post (4) and the auxiliary support post (13) are fixed to the ground via the base (11), the light intensity signal collector (1) is mounted on the top surface of the sunlight collector rack (2), the lift rod (6) is disposed between one side of the north-south rotary shaft (3) of the sunlight collector rack (2) and an edge of the sunlight collector rack (2) in a north-south axial direction, the lift rod (6) is fastened to the bottom surface of the sunlight collector rack (2) and is concentrically arranged with a worm gear of the worm gear transmission mechanism (7) and passes through the center of the worm gear, wherein a telescopic sleeve (5) is disposed outside the lift rod (6) above the worm gear transmission mechanism (7) to enclose the lift rod (6) within the sleeve (5), the lift rod (6) below the worm gear transmission mechanism (7) is arranged in the oil sump (10), the bottom surface of the worm gear transmission mechanism (7) is fixed to the ground via the base (11), and the step motor (12) is mounted outside the worm gear transmission mechanism (7) and is connected to the controller (8) via a power source and control signal cable (9).

2. The laterally-adjusted automatic solar tracking device according to claim 1, characterized in that the upper ends of the main support post (4) and the auxiliary support post (13) are fastened to the north-south rotary shaft (3) of the sunlight collector rack (2) respectively via a joint bearing and a pressure bearing and the lift rod (6) is fastened to the bottom surface of the sunlight collector rack (2) via a thrust bearing (21) and a joint bearing (22) so that the sunlight collector rack (2) forms a three-point fastening structure or a point-line fastening structure with the main support post (4), the auxiliary support post (13) and the lift rod (6).

3. The laterally-adjusted automatic solar tracking device according to claim 1, characterized in that the upper end of the lift rod (6) is fastened to the bottom surface of the sunlight collector rack (2), and the sole immobile point during swing of the lift rod (6) is an intersection between the lift rod (6) and the bottom surface of the worm gear transmission mechanism (7) and the base (11) when the lift rod (6) passes through the worm gear transmission mechanism (7), the intersection being directly fixed to the ground.

4. The laterally-adjusted automatic solar tracking device according to claim 1, characterized in that an external thread (14) mating with an internal thread in the center of the worm gear of the worm gear transmission mechanism (7) is provided on the outer surface of the lift rod (6) for bearing output torque from the worm gear transmission mechanism (7), the telescopic sleeve (5) disposed outside the lift rod (6) above the worm gear transmission mechanism (7) is formed by an upper sleeve (16), an intermediate sleeve (17) and a lower sleeve (18) having sequentially decreased radii from the top to the bottom of the sleeve, wherein the intermediate sleeve (17) is designed as one or more segments according to a user's requirements, and the sleeve (5) is provided with a fastening flange (15) at the upper end thereof and a fastening flange (19) at the lower end thereof.

5. The laterally-adjusted automatic solar tracking device according to claim 1, characterized in that the bottom surface of the worm gear transmission mechanism (7) is fastened to the base (11) via a double spherical bearing (24), and the lift rod (6) passes through the center of the double spherical bearing (24) so that the double spherical bearing (24) can freely swing in a horizontal plane with the lift rod (6).

6. The laterally-adjusted automatic solar tracking device according to claim 1, characterized in that the worm gear transmission mechanism (7) comprises a gear set and a worm gearing system, the controller (8) comprises a microprocessor, driving torque and rotational speed of the step motor (12) is controlled by a program stored in the microprocessor which also stores sun travelling position information, and the controller (8) is provided with an on/off button, an anti-windstorm button and an anti-hail button on a panel thereof.

7. The laterally-adjusted automatic solar tracking device according to claim 1, characterized in that the light intensity signal collector (1) is a photoelectric receiving device for converting light intensity signals of the sun into electrical signals so as to control on/off of the device and correct solar tracking errors via the controller (8).

8. The laterally-adjusted automatic solar tracking device according to claim 1, characterized in that the north-south rotary shaft (3) of the sunlight collector rack (2) is within a vertical plane of the north-south polar axis of the earth.

* * * * *